US009099869B2

(12) United States Patent
Taurand et al.

(10) Patent No.: US 9,099,869 B2
(45) Date of Patent: Aug. 4, 2015

(54) POWER SUPPLY SYSTEM WITH PRIORITIZED NETWORK SELECTION

(71) Applicant: Thales, Neuilly sur Seine (FR)

(72) Inventors: Christophe Taurand, Valence Cedex (FR); Arnaud Bretez, Valence Cedex (FR)

(73) Assignee: Thales, Neuilly sur Seine (FR)

( * ) Notice: Subject to any disclaimer, the term of this patent is extended or adjusted under 35 U.S.C. 154(b) by 441 days.

(21) Appl. No.: 13/725,448

(22) Filed: Dec. 21, 2012

(65) Prior Publication Data

US 2013/0175868 A1    Jul. 11, 2013

(30) Foreign Application Priority Data

Dec. 23, 2011 (FR) ...................................... 11 04093

(51) Int. Cl.
*H02J 1/00* (2006.01)
*H02J 9/06* (2006.01)
*H02J 1/10* (2006.01)

(52) U.S. Cl.
CPC . *H02J 1/00* (2013.01); *H02J 1/108* (2013.01); *H02J 9/06* (2013.01); *H02J 1/10* (2013.01); *Y10T 307/696* (2015.04)

(58) Field of Classification Search
USPC ................................................ 307/77, 80, 82
See application file for complete search history.

(56) References Cited

U.S. PATENT DOCUMENTS

| 5,216,286 A | 6/1993 | Peterson |
| 7,615,965 B2 * | 11/2009 | Popescu-Stanesti et al. . 320/128 |
| 7,969,043 B2 * | 6/2011 | Caraghiorghiopol et al. .. 307/82 |
| 2008/0150356 A1 | 6/2008 | Breit et al. |

FOREIGN PATENT DOCUMENTS

| EP | 2 354 864 A1 | 8/2011 |
| EP | 2 363 940 A2 | 9/2011 |

(Continued)

OTHER PUBLICATIONS

INPI Search Report dated Jun. 14, 2012 relative to French Publication No. FR 11 04093.

*Primary Examiner* — Danny Nguyen
(74) *Attorney, Agent, or Firm* — Knobbe Martens Olson & Bear LLP

(57) ABSTRACT

A power supply system with prioritized network selection is disclosed. In one aspect, the system can be connected to the output of N power supply networks ($R^1, \ldots, R^N$), N being an integer greater than or equal to 2. It includes N controllable energy transfer members ($T^1, \ldots, T^N$) each connected to a power supply network ($R^1, \ldots, R^N$), control subsystem (14) for selecting one power supply network ($R^1, \ldots, R^N$) by commanding the controllable member ($T^1, \ldots, T^N$) connected to the selected power supply network ($R^1, \ldots, R^N$) into a closed position, and energy storage subsystem capable of delivering a storage voltage ($V^e$). It may also comprise an energy converter connected to the output to the N controllable energy transfer members ($T^1, \ldots, T^N$), the control subsystem being able to command the energy converter and the N controllable energy transfer members ($T^1, \ldots, T^N$) to select at most one energy source from among the N power supply networks ($R^1, \ldots, R^N$), as a function of the N input voltages ($V^1, \ldots, V^N$) and the storage voltage ($V^e$).

15 Claims, 4 Drawing Sheets

(56) References Cited

FOREIGN PATENT DOCUMENTS

| FR | 2 815 789 A1 | 4/2002 |
| GB | 2 448 062 A | 10/2008 |
| WO | WO 97/21265 A2 | 6/1997 |

* cited by examiner

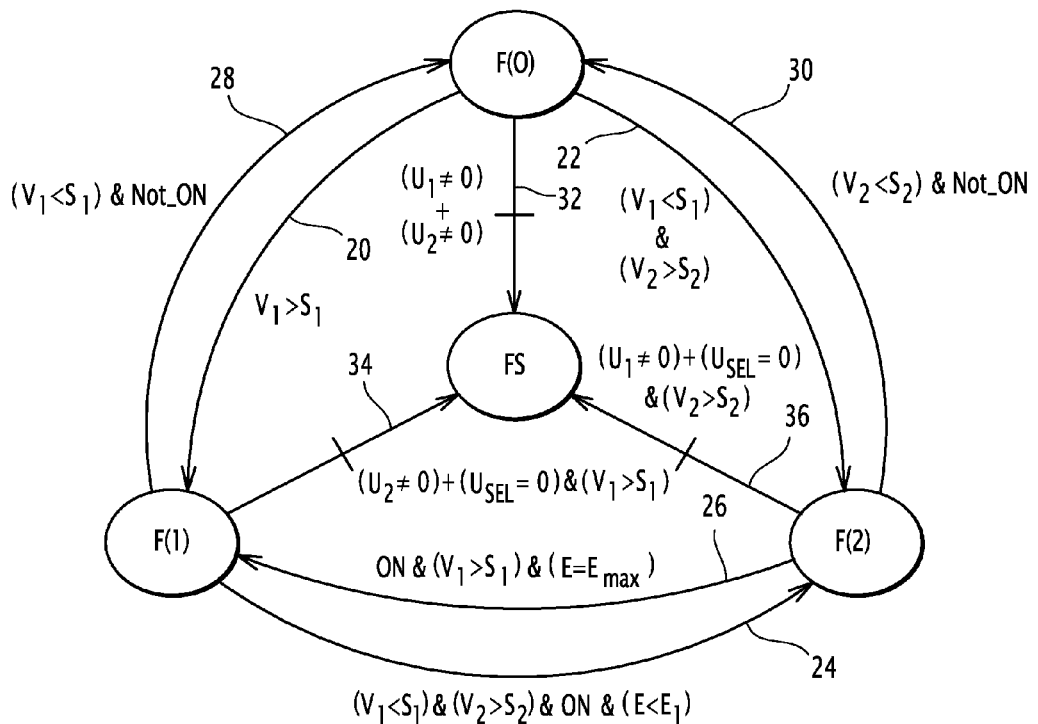
FIG.5
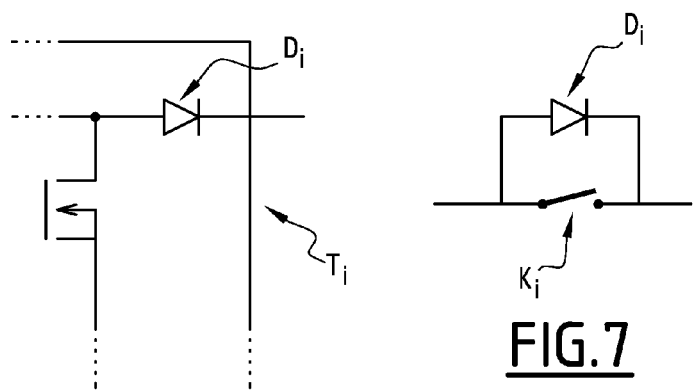
FIG.6
FIG.7

POWER SUPPLY SYSTEM WITH PRIORITIZED NETWORK SELECTION

CROSS-REFERENCE TO RELATED APPLICATIONS

This application claims priority to French patent application no. 11-04093 filed on Dec. 23, 2011, the contents of which are incorporated by reference in its entirety.

BACKGROUND OF THE INVENTION

1. Field of the Invention

The present invention relates to a power supply system, and more specifically, the system applies to the field of electronic equipment power supply systems from several distinct power supply networks. Such power supply systems are frequently used in particular in aeronautics, to supply power to electronic equipment of the avionics cabinet, flight data module, or other type.

2. Description of the Related Technology

Document FR 2 815 789 A1 describes a power supply system of the aforementioned type. The power supply system comprises a battery of capacitors forming the energy storage subsystem, as well as a diode switch to select a power supply network from among the N networks.

The power supply system is capable of selecting a power supply network from among the networks to which it is connected. It is capable of switching to a redundant network when the voltage delivered by an adapter associated with the selected power supply network is below a given threshold.

This makes it possible to switch toward a redundant power supply network during power line disturbances or outages on the output voltage from the system. The presence of the energy storage subsystem then limits the impact of such power line disturbances or outages on the output voltage of the system.

The selection between the power supply networks is made according to a priority order determined as a function of predetermined voltage thresholds associated with the output voltages of the controllable energy transfer members.

However, in a context of increasing the dynamics of the power supply networks in aeronautics, during outages or power line disturbances occurring on the selected network, the power supply system commands switching between the networks once the associated voltage threshold is crossed, even if it is not strictly necessary. This tends to needlessly wear out the various members of the power supply system and decrease their lifetime, as well as creating instabilities and disturbances in the power supply networks due to untimely switching, which is particularly restrictive when the power supply system is onboard an aircraft.

SUMMARY OF CERTAIN INVENTIVE ASPECTS

The aim of various aspects is therefore to limit the number of switches between the networks.

To that end, the inventive aspects relate to a power supply system of the aforementioned type, characterized in that it also comprises an energy converter connected to the output of the N controllable energy transfer members, the control subsystem being capable of controlling the energy converter and the N controllable energy transfer members to select at most one energy source from among the N power supply networks, as a function of the N input voltages and the storage voltage.

According to other advantageous aspects, the power supply system comprises one or more of the following features, considered alone or according to all technically possible combinations:

- the energy storage subsystem have a maximum storage capacity, the power supply networks are ordered by increasing energy levels, each energy level being predetermined and associated with the corresponding power supply network and having a positive value below the maximum storage capacity, and the control subsystem are adapted to select, as a priority, the power supply network associated with the highest energy level;
- voltage thresholds are respectively associated with the power supply networks, the control subsystem being capable of controlling the switching from a first power supply network to a second power supply network only if the second power supply network has an input voltage higher than the corresponding voltage threshold;
- the difference between two successive energy levels corresponds to the energy supplied by the energy storage subsystem to the energy converter during the outage, for a transparency duration unique to each power supply network, of the input voltage of the power supply network with the lowest associated energy level of the two energy levels;
- the control subsystem are adapted to command the switch from a first power supply network, the transparency duration of which is longer than a predetermined delay period, to a second power supply network during a outage of the input voltage of the first power supply network for a duration longer than the delay period;
- the storage voltage is representative of a quantity of energy of the energy storage subsystem, and the control subsystem are adapted to command the switch from a first power supply network to a second power supply network with a lower associated energy level, during a outage of the input voltage of the first power supply network, only if the quantity of energy of the energy storage subsystem is lower than the energy level associated with the first power supply network;
- the control subsystem are adapted to command the switch from a first power supply network to a second power supply network with a higher energy level only if the amount of energy of the energy storage subsystem is equal to the maximum storage capacity;
- the control subsystem are adapted to command the selection of no energy source by commanding all of the controllable energy transfer members into the open position;
- the energy storage subsystem have a maximum storage capacity, the control subsystem being able to inhibit the switch from a first power supply network, toward which switching was commanded from the selection of no energy source, to a second power supply network as long as the quantity of energy of the energy storage subsystem is not equal to the maximum storage capacity;
- the power supply system also comprises a shared power supply line having a selection voltage, the controllable energy transfer members are connected to the shared power supply line, and the control subsystem are capable of commanding the energy converter and the N controllable energy transfer members to select at most one energy source from among the N power supply networks, as a function of the N input voltages, of the storage voltage, of intermediate voltages delivered by the controllable energy transfer members, and of the selection voltage;

the control members are adapted to command the switch to a secured state of the power supply network in which the controllable energy transfer members are all commanded into the open position, their command into the closed position being inhibited;

the control subsystem are adapted to command the switch from the selection of no energy source to the secured state if at least one intermediate voltage is non-zero;

the voltage thresholds are respectively associated with the power supply networks, the switching/selection subsystem being able to command the switch of a power supply network to the secured state if at least one controllable energy transfer member other than the controllable power transfer member associated with the power supply network has a non-zero intermediate voltage or if the selection voltage is zero whereas the input voltage of the power supply network is above the associated voltage threshold; and the power supply network also comprises a shared power supply line to which the controllable energy transfer members are connected, and the power supply system comprises N unidirectional diodes respectively connected between the output of the given controllable energy transfer member and the shared power supply line.

Various embodiments may have other features of interest as described below.

BRIEF DESCRIPTION OF THE DRAWINGS

The invention will be better understood upon reading the following description, provided solely as an example, and done in reference to the appended drawings, in which:

FIG. 5 is a view similar to that of FIG. 3 according to the second embodiment of the invention;

FIG. 6 is an illustration of a unidirectional diode according to a third embodiment;

FIG. 7 is a view similar to that of FIG. 6 according to a fourth embodiment of the invention.

DETAILED DESCRIPTION OF CERTAIN INVENTIVE EMBODIMENTS

Hereafter, the indices i, j, k, etc. are used non-limiting and their usage context will be explained.

Figure 1:
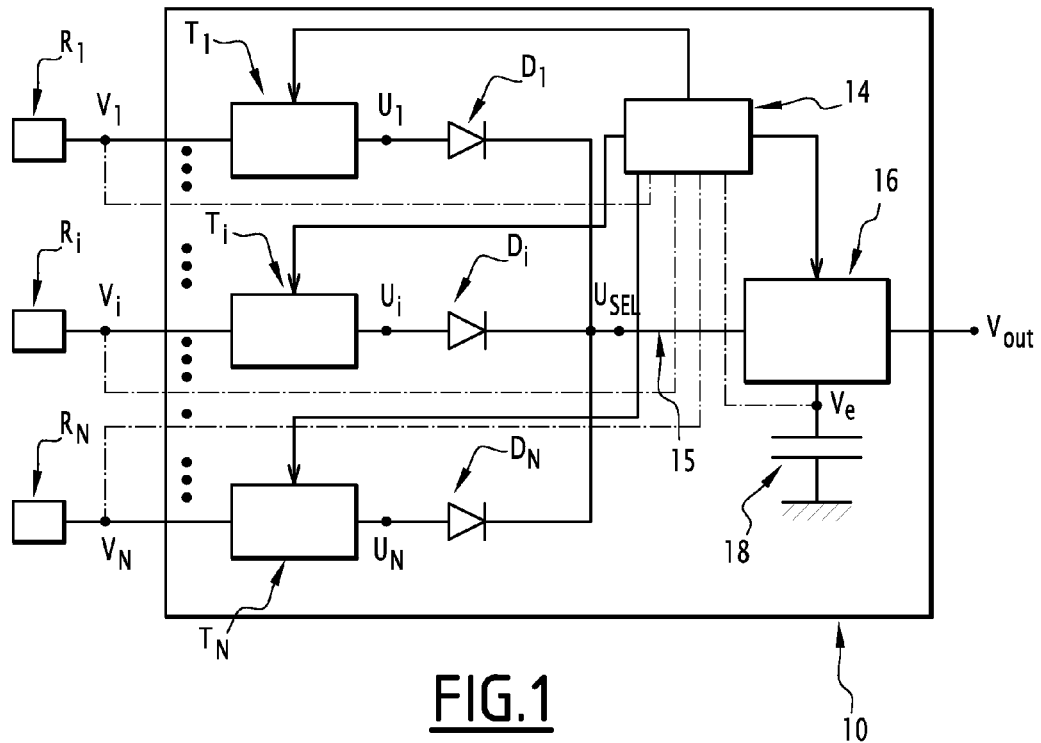
FIG. 1 is a diagrammatic illustration showing a power supply system comprising energy storage subsystem according to a first embodiment of the invention.

In reference to FIG. 1, a power supply system 10 designed to be onboard an aircraft is adapted to be connected at its input to N distinct power supply networks $R^1, \ldots, R^N$, N being an integer greater than or equal to 2, each power supply network $R^i$ delivering an input voltage $V^i$, being a positive integer comprised between 1 and N.

The power supply system 10 can select one of these power supply networks $R_1, \ldots, R^N$ at most as the energy source for the power supply system 10. It can command the switch from one power supply network $R^i$ to another network $R^j$ according to a switching logic, also called selection logic hereafter, and outlined below, j being an integer comprised between 1 and N and different from i, and the other power supply networks $R^1, \ldots, R^N$ being unused.

Lastly, the system 10 can be connected at its output to charges, such as electronic pieces of equipment, so as to deliver a DC output voltage $V^{out}$ to them from the input voltage $V^i$ delivered by the selected power supply network $R^i$. The output voltage $V^{out}$ is preferably regulated.

The power supply system 10 comprises N controllable energy transfer members $T^1, \ldots, T^N$, also called controllable power transfer members $T^1, \ldots, T^N$ or controllable members $T^1, \ldots, T^N$, and control subsystem 14 for the members $T^1, \ldots, T^N$. It also comprises a shared power supply line 15, an energy converter 16, and energy storage subsystem 18. It comprises N unidirectional diodes $D^1, \ldots, D^N$ connected between the controllable members $T^1, \ldots, T^N$ and the shared line 15.

In a known manner, each power supply network $R^i$ delivers a DC or AC input voltage $V^i$, for example from an alternator, or from a battery, for example with a rated voltage equal to +28V.

The N controllable members $T^1, \ldots, T^N$ can transfer the electrical energy delivered by the power supply networks $R^1, \ldots, R^N$ to the power supply system 10, or on the contrary inhibit the transfer of the electrical energy to the power supply system.

Each controllable member $T^i$ is connected to a corresponding power supply network $R^i$ and can switch between an open position and a closed position. Each controllable member $T^i$ is designed to be commanded into the open or closed position by the control subsystem 14.

The output of each controllable member $T^1, \ldots, T^N$ is connected to the shared power supply line 15, the line having a selection voltage $U^{SEL}$. The selection voltage $U^{SEL}$ is a DC voltage.

Each controllable member $T^i$ can receive the input voltage $V^i$ supplied by the corresponding power supply network $R^i$ and deliver an intermediate voltage $U^i$.

Each intermediate voltage $U^i$ is a DC voltage, the controllable member $T_i$ including a converter for converting AC voltage into DC voltage when the corresponding power supply network $R_i$ is an alternating network.

During nominal operation of the power supply system 10, the selection voltage $U^{SEL}$ of the shared power supply line 15 is equal to the intermediate voltage $U^i$ corresponding to the selected network $R^i$.

In a known manner, each member $T^i$ comprises:

one or more electromechanical relay-type switches, or static switches of the MOSFET (Metal Oxide Semiconductor Field Effect Transistor) or IGBT (Insulated Gate Bipolar Transistor) type, or a monodirectional insulated power converter, or a monodirectional non-insulated power converter, or a bidirectional insulated power converter, or a bidirectional non-insulated power converter.

The energy converter 16 can allow the transfer of electrical energy from the power supply networks $R^1, \ldots, R^N$ to the energy storage subsystem 18 and to the electronic equipment to which the power supply system 10 is connected as output. Furthermore, it is adapted to regulate the output voltage $V^{out}$ to a stipulated voltage from a storage voltage $V^e$ delivered by the energy storage subsystem 18 and the selection voltage $U^{SEL}$ of the shared power supply line 15.

The energy converter 16 is connected in input to the shared power supply line 15 and delivers the output voltage $V^{out}$.

The converter 16 is, in a known manner, an insulated converter. Alternatively, the converter 16 is a non-insulated converter. Also alternatively, the converter 16 is a monodirectional converter. Alternatively, the converter 16 is a bidirectional converter.

The energy storage subsystem 18 are connected to the power supply line 15 via the energy converter 16.

The energy storage subsystem 18 can limit the impact, on the output voltage $V^{out}$, of outages of the voltage $V^i$ occurring on the selected power supply network $R^i$.

The storage subsystem 18 can store the electrical energy coming from the power supply networks $R^1, \ldots, R^N$ by subsystem of the energy converter 16 or restore the electrical energy stored to the converter 16.

The energy storage subsystem 18 comprise, in a known manner, an aluminum electrochemical capacitor and/or one or more batteries and/or supercapacitor devices.

The energy storage subsystem 18 have a maximum energy storage capacity $E^{max}$. The storage voltage $V^e$ delivered by the energy storage subsystem 18 to the energy converter 16, is representative of a quantity of energy E stored in the subsystem 18.

Alternatively, when the controllable members $T_i$ have an intermediate voltage $U_i$ close to the storage voltage $V^e$, which is for example the case when the controllable members $T_i$ perform an energy conversion, the energy storage subsystem 18 are placed directly on the shared power supply line 15 and the converter 16 is eliminated.

Figure 2:
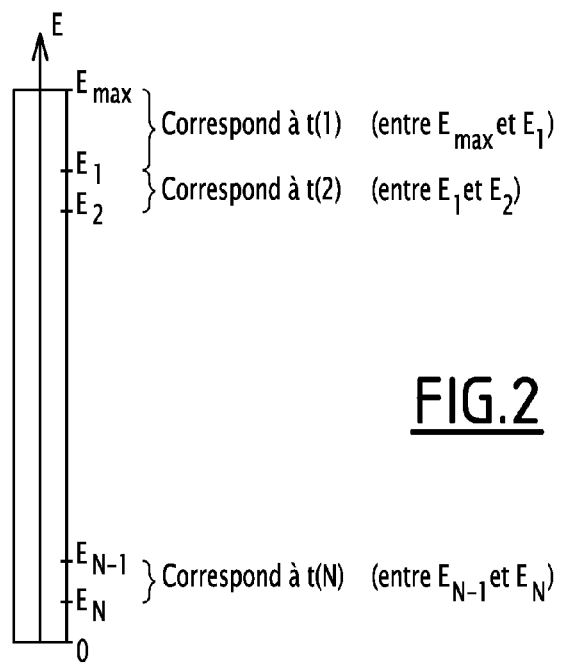
FIG. 2 is a diagrammatic illustration of a scale of energy levels of the energy storage subsystem according to the first embodiment of the invention.

In reference to FIG. 2, the power supply networks $R^1, \ldots, R^N$ are ordered by decreasing energy levels $E^1, \ldots, E^N$, each energy level $E^1, \ldots, E^N$ being predetermined, associated with a corresponding power supply network $R_1, \ldots, R^N$ and having a positive value below the maximum energy storage capacity $E^{max}$. The control subsystem 14 are adapted to select, as a priority, the power supply network $R^1, \ldots, R^N$ associated with the highest energy level $E^1, \ldots, E^N$.

The difference between two successive predetermined energy levels $E^{u-1}$ and $E^u$, u being an integer comprised between 1 and N, $E^0$ corresponding to $E^{max}$ corresponds to the energy supplied by the energy storage subsystem 18 to the energy converter 16 so as to offset the outage for a duration t(u) of the voltage $V^u$ delivered by the selected power supply network $R^u$ with the lowest energy level $E^u$ from among the to networks $R^{u-1}$ and $R^u$. The duration t(u) is also called the transparency of the power supply network $R^u$, and is predetermined specifically for each power supply network $R^u$. This duration t(u) corresponds to the time interval occurring between the outage of the network $R^{u-1}$ and the switch to the power supply network $R^u$. This transparency t(u) is predetermined for a known output power of the power supply system 10 and a maximum turnoff time to be respected. The maximum turnoff time is for example defined by a standard.

Each unidirectional diode $D^i$ associated with a given power supply network $R^i$ is arranged so as to be on in the direction of the transfer of energy from the power supply network $R^i$ toward the energy converter 16 and to be blocked in the opposite direction when the power supply network $R^i$ is not selected.

The diodes $D^1$ make it possible to avoid a transfer of energy between the power supply networks $R^1, \ldots, R^N$.

Alternatively, each unidirectional diode $D^i$ is associated with a switch capable of reducing the losses of the unidirectional diode $D^i$ when the corresponding power supply network $R^i$ is selected. To that end, the switch is then closed on the unidirectional diode $D^i$.

The control subsystem 14 are adapted to command the energy converter 16 to regulate the storage voltage $V^e$ and command the controllable members $T^1, \ldots, T^N$ into the open or closed position to select at most one energy source from among the N energy supply networks $R^1, \ldots, R^N$, as a function of the input voltages $V^1, \ldots, V^N$ and the storage voltage $V^e$.

To select the power supply network $R^i$, the control subsystem 14 can command the corresponding controllable member $T^i$ into the closed position such that the member $T^i$ communicates the electrical energy delivered by the power supply network $R^i$ to the shared line 15. The control subsystem 14 are adapted to command the other controllable members $T^k$, for an integer k comprised between 1 and N and different from i, into the open position such that the other corresponding power supply networks $R^k$ are then not used by the power supply system 10.

The control subsystem 14 for example comprise programmable logic circuits (not shown), of the microcontroller or FPGA (Field-Programmable Gate Array) type, capable of implementing the switching logic between the N power supply networks $R^1, \ldots, R^N$ to select one energy source at most. Complementarily, they comprise voltage comparators capable of detecting that voltage thresholds $S^1, \ldots, S^N$ associated with the input voltages $V^1, \ldots, V^N$ have been crossed, as described below. The voltage threshold values $S^1, \ldots, S^N$ are predetermined as a function of criteria, for example such as the minimum allowable working voltage for the controllable members $T^1, \ldots, T^N$ and/or the minimum allowable startup voltage on the power supply networks $R^1, \ldots, R^N$.

The control subsystem 14 are also capable of controlling the switching from a first power supply network $R^1, \ldots, R^N$ to a second power supply network $R^1, \ldots, R^N$ only if the second power supply network $R^1, \ldots, R^N$ has an input voltage $V^1, \ldots, V^N$ above the corresponding voltage threshold $S^1, \ldots, S^N$.

Furthermore, when the input voltage $V^u$ of the selected power supply network $R^u$ disappears for a duration longer than the transparency t(u) of that power supply network, the control subsystem 14 are capable of commanding the switching to a redundant power supply network as a function of the switching logic outlined below.

The switching logic between the power supply networks $R^1, \ldots, R^N$ using control subsystem 14 implements a state machine including N+1 distinct states $F(0), F(1), \ldots, F(N)$, representative of the possible states of the power supply system 10, i.e.:

a state $F(0)$ corresponding to the selection of no energy source by the control subsystem 14, N states $F(i)$, in which the corresponding power supply network $R^i$ is selected as energy source, and the other power supply networks are then not used, i being an integer comprised between 1 and N.

The control subsystem 14 command the opening or closing of the corresponding controllable members $T^i$ to ensure the passage from a state $F(x)$ to a state $F(y)$ as a function of the input voltages $V^1, \ldots, V^N$, as well as the amount of energy E stored in the energy storage subsystem 18, for any integer x and y comprised between 0 and N and different from each other.

The operation and the switching logic of the control subsystem 14 will be described in more detail below.

Initially, the power supply system 10 is in the state $F(0)$.

The power supply system 10 can then leave that state $F(0)$ for a state $F(i)$, i being an integer comprised between 1 and N, only if the condition $V^i > S^i$ is verified by at least one of the power supply networks $R^i$. If several power supply networks verify the previous condition, the selected power supply network $R^i$ is that having the smallest index i.

If the value of the quantity of energy E becomes smaller than the smallest energy level $E^N$, the control subsystem 14 command all of the controllable members $T^1, \ldots, T^N$ into the open position so as not to select any energy source, the power supply system 10 then returning to the state F(0).

This occurs in particular when the voltage $V^i$ of the selected power supply network $R^i$ does not verify the condition $V^i > S^i$ and no power supply network with a lower energy level itself verifies that condition. The energy storage subsystem 18 then deplete until the amount of energy E is smaller than the smallest energy level $E^N$.

The selection of a power supply network $R^j$ with an energy level $E^j$ higher than the energy level $E^i$ is then possible from the state F(0).

After switching from the state F(0) to a state F(s), s being an integer comprised between 1 and N, the passage to another state F(k), k being an integer comprised between 1 and N and different from s, is only allowed by the control subsystem 14 once the condition $E = E^{max}$ is verified. In other words, after the switching from the selection of no energy source to a first power supply network $R^S$, the control subsystem 14 can inhibit the switching toward a second power supply network $R^k$ as long as the amount of energy E of the energy storage subsystem 18 has not reached the maximum storage capacity $E^{max}$.

This makes it possible to avoid deactivation of the priority power supply network when that network is strongly disrupted, for example when it has many outages in its input voltage. The control subsystem 14 then only command the switch to another power supply network $R^1, \ldots, R^N$, when the successive power line disturbances have depleted the energy storage subsystem 18.

For a given power supply network $R^i$, the cumulative time of the power line disturbances that the power supply network can undergo without the control subsystem 14 commanding switching to another power supply network $R^1, \ldots, R^N$ is of the same order of magnitude as the transparency t(i).

The amount of time between the passage from the state F(0) to a state F(s) and the moment when the condition $E = E^{max}$ is verified is called the startup of the power supply system 10.

To that end, the control subsystem 14 generate an ON state signal, which is validated once the amount of energy E has reached the maximum storage capacity $E^{max}$, and invalidated when the amount of energy E becomes lower than the smallest energy level $E^N$. The logic condition associated with the generation of that state signal is then written:

ON=(ON+($E=E^{max}$)) & ($E>E^N$), the inverse logic condition being noted Not_ON hereafter.

After starting up the power supply system 10, i.e., when the ON state signal is validated, the control subsystem 14 can, during a outage of the input voltage $V^l$ delivered by the selected power supply network $R^l$, command the passage from the corresponding state F(I) to a state F(z), I and z being integers respectively comprised between 1 and N−1 and between 2 and N, with I<z, if the following condition is verified.

$E<E^l$ and $V^z>S^z$ (C1)

In other words, the control subsystem 14 can command the switch from a first power supply network $R^l$ to a second associated power supply network $R^z$ with a lower energy level $E^z$ only if the amount of energy E is lower than the energy level $E^l$ associated with the first power supply network $R^l$ and if the second power supply network $R^z$ has an input voltage $V^z$ higher than the associated voltage threshold $S^z$.

Among all of the power supply networks $R^w$ verifying the condition $V^w > S^w$, the power supply network $R^z$ associated with a higher energy level $E^z$ is then selected. Thus, if the power supply network $R^{l+1}$ associated with a directly lower energy level $E^{l+1}$ delivers an input voltage $V^{l+1}$ higher than the corresponding voltage threshold $S^{l+1}$, that power supply network $R^{l+1}$ is selected.

Furthermore, when the ON state signal is validated, the control subsystem 14 command the passage of the power supply system 10 from a state F(r) to a state F(m), where r and m are integers comprised between 1 and N and m<r, if the following condition is verified:

$E=E^{max}$ and $V^m > S^m$ (C2)

In other words, the control subsystem 14 can command the switch from a first power supply network $R^r$ to a second associated power supply network $R^m$ with a higher energy level $E^m$ only if the amount of energy E of the energy storage subsystem 18 is equal to the maximum storage capacity $E^{max}$ and if the input voltage $V^m$ delivered by the second power supply network $R^m$ is higher than the corresponding voltage threshold $S^m$.

Among all of the power supply networks $R^x$ verifying the condition $V^x > S^x$, the power supply network $R^m$ associated with a maximum energy level $E^m$ is then selected. Thus, if the power supply network $R^1$ with a maximum energy level $E^1$ from among all of the energy levels $E^1, \ldots, E^N$ delivers an input voltage higher than the corresponding voltage threshold $S_1$, that power supply network $R^1$ is selected.

The two switching conditions C1 and C2 pertaining both to the availability of the power supply networks $R^1, \ldots, R^N$ and the amount of energy E of the energy storage subsystem 18 make it possible to eliminate untimely switching between the power supply networks $R^1, \ldots, R^N$.

Condition C1 makes it possible to eliminate untimely switching during power line disturbances occurring on the input voltage of the selected network $R^i$.

Condition C2 makes it possible to eliminate untimely switching during the reappearance of a priority power supply network relative to the selected power supply network $R^i$. These two conditions apply on any power supply network $R^1, \ldots, R^N$.

This thereby makes it possible to decrease the number of switches between the power supply networks $R^1, \ldots, R^N$ and to avoid generating instabilities and disturbances of the power supply networks due to untimely switching, as well as to increase the lifetime of the members of the power supply system 10 according to the invention. In fact, in the state of the art, in the event of a large number of successive power line disturbances, the switches between networks are also very numerous, which causes significant variations in the consumed currents. This tends to cause instabilities of all of the equipment powered by the power supply network Ri.

Furthermore, the priority order between the power supply networks $R^1, \ldots, R^N$ and the duration of the power line disturbance having to be held by each network $R^1, R^N$ can be configured through the choice of predetermined energy level $E^1, \ldots, E^N$ and transparency t(1), ..., t(N) values. This in particular makes it possible to adapt the selection logic of at most one energy source to various constraints, such as flight constraints, hardware configuration constraints, etc.

Figure 3:
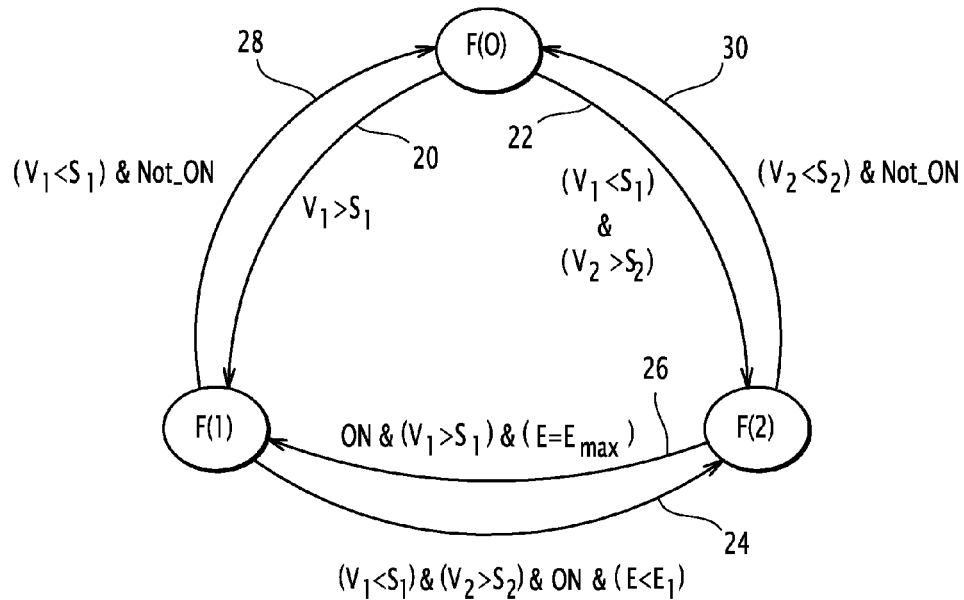
FIG. 3 is a diagram of operating states of the power supply system of FIG. 1.

In the example embodiment of FIG. 3, illustrated in the case where N is equal to 2, the control subsystem 14 can command:

the passage from the state F(0) to the state F(1) if ($V^1 > S^1$), (arrow 20), the passage from the state F(0) to the state F(2) if ($V^1 < S^1$) & ($V^2 > S^2$), (arrow 22), the passage from the state F(1) to the state F(2) if ($V^1 < S^1$) & ($V^2 > S^2$) & ON & ($E < E^1$), (arrow 24), the passage from the state F(2) to the state F(1) if ($V^1 > S^1$) & ($E = E^{max}$) & ON, (arrow 26), the passage from the state F(1) to the state F(0) if ($V^1 < S^1$) & Not_ON, (arrow 28), and the passage from the state F(2) to the state F(0) if ($V^2 < S^2$) & Not_ON, (arrow 30).

Figure 4:
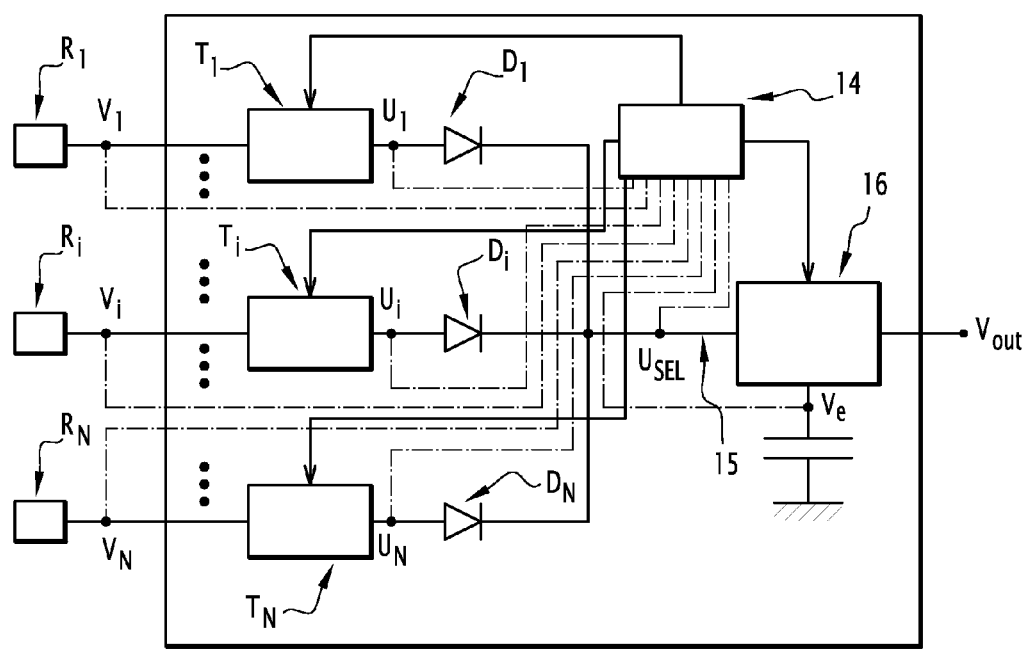
FIG. 4 is a view similar to that of FIG. 1 according to a second embodiment of the invention.

FIG. 4 illustrates a second embodiment of the power supply system 10 for which the elements similar to the first embodiment previously described are identified using identical references, and are not described again.

According to the second embodiment, the control subsystem 14 can detect and prevent the propagation to other power supply networks of failures of the controllable members $T^1, \ldots, T^N$ or the unidirectional diodes $D^1, \ldots, D^N$ by selecting at most one energy source as a function of the N input voltages $V^1, \ldots, V^N$, the storage voltage $V^e$, the intermediate voltages $U^1, \ldots, U^N$ and the selection voltage $U^{SEL}$.

When a given power supply network $R^i$ is selected, with i being an integer comprised between 1 and N, the control subsystem 14 diagnose a failure of the associated controllable member $T^i$ by measuring the voltage $U^{SEL}$.

If the voltage $U^{SEL}$ is positive, then the controllable member $T^i$ is in the operating state.

If the voltage $U^{SEL}$ is zero, then the controllable member $T^i$ comprises at least one no-load circuit component, and the power supply network $R^i$ therefore cannot be used to power the power supply system 10. The corresponding power supply network $R^i$ is then excluded from the set of power supply networks that can be selected by the control subsystem 14.

This is for example done through a modification of the selection logic of the control subsystem 14. The state F(i) corresponding to the selection of the power supply network $R^i$ whereof the corresponding controllable member $T^i$ is faulty can then be eliminated from the state machine, as shown in FIG. 5, so as to prohibit switching toward the selection of that network.

Complementarily, when a given power supply network $R^j$ is selected, with j being an integer comprised between 1 and N, the control subsystem 14 diagnose the proper operation of the unidirectional diodes $D^1, \ldots, D^N$ by measuring the intermediate voltages $U^1, \ldots, U^N$.

Thus, for any j that is an integer comprised between 1 and N:

if the voltage $U^j$ is zero 0, then the unidirectional diode $D^j$ is in the operating state; and if $U^j$ is positive, then the unidirectional diode $D^j$ may be short-circuited, in which case the power supply networks $R^1, \ldots, R^N$ are no longer electrically insulated from each other.

Only the power supply network $R^j$ whereof the unidirectional diode $D^j$ is faulty can then be selected by the control subsystem 14, the other power supply networks having to be kept isolated from that network. If the availability of the power supply system 10 is not a predominant criterion, the control subsystem 14 command the selection of no energy source, as will be seen below.

The operation of the power supply system 10 according to the second embodiment of the invention will now be described in more detail.

In addition to the N-1 aforementioned states of the power supply system 10, an additional state FS (Fail Safe) is defined, in which all of the controllable members $T^1, \ldots, T^N$ are commanded into the open position, their command into the closed position also being inhibited.

The control subsystem 14 are adapted to inhibit the passage of the power supply system from the state FS to any state F(e), e being an integer comprised between 0 and N, unlike in the preceding with respect to the state F(0) capable of switching to another state.

In the second embodiment, the control subsystem 14 can command:

the switching from the state F(0) to the state FS if an integer q exists comprised between 1 and N such that $U^q \neq 0$, i.e., if one of the intermediate voltages $U^1, \ldots, U^N$ is non-zero, and the switching from a given state F(h), h being an integer comprised between 1 and N, to the state FS if an integer g exists comprised between 1 and N and different from h such that $U^g \neq 0$ or if the conditions $U^{SEL} = 0$ et $V^h > S^h$ are verified, i.e. if at least one controllable member $T^g$ other than the controllable member $T^h$ associated with the selected power supply network $R^h$ has a non-zero intermediate voltage $U^g$ or if the selection voltage $U^{SEL}$ is zero while the input voltage $V^h$ of the power supply network $R^h$ is higher than the associated voltage threshold $S^h$.

In the example embodiment of FIG. 5, illustrating the case where N is equal to 2, the control subsystem 14 command, in addition to the passages between the states previously described in light of FIG. 3, the following passages:

the passage from the state F(0) to the state FS if ($U^1 \neq 0$) or ($U^2 \neq 0$), (arrow 32);

the passage from the state F(1) to the state FS if ($U^2 \neq 0$) or ($U^{SEL} = 0$) and ($V^1 > S^1$), (arrow 34); and the passage from the state F(2) to the state FS if ($U^1 \neq 0$) or ($U^{SEL} = 0$) and ($V^2 > S^2$) (arrow 36).

The switching logic between the power supply networks implemented in this embodiment in particular makes it possible to reinforce the electrical isolation between the power supply networks $R^1, \ldots, R^N$, in particular in the event of breakdowns of members of the power supply system 10. This embodiment is therefore preferably used to increase the security of the power supply system 10.

According to one alternative, not shown and advantageously implemented when the availability of the power supply system 10 is an important constraint, the control subsystem 14 command passage of the power supply system 10 to a state F(p), p being an integer comprised between 1 and N, if the condition $U^p \neq 0$ is verified while the condition $U^f = 0$ is verified for any integer f comprised between 1 and N and different from p.

This switching logic makes it possible to electrically isolate the power supply networks from a power supply network $R^i$ whereof the corresponding unidirectional diode $D^i$ is potentially faulty while ensuring operation of the power supply system 10 in failsafe mode.

Furthermore, the control subsystem 14 inhibit the passage of the power supply system 10 toward any state F(x), x being an integer comprised between 1 and N, in which the conditions $U^{SEL} = 0$ and $V^x > S^x$ are verified.

FIG. 6 illustrates a third embodiment of the power supply system 10 for which the elements similar to the first embodiment previously described are identified using identical references, and are not described again.

According to the third embodiment, at least one controllable member $T^i$ of the power supply system 10 comprises an energy converter including the unidirectional diode $D^j$. The converter is for example a rectifier.

FIG. 7 illustrates a fourth embodiment of the power supply system 10 for which the elements similar to the first embodiment previously described are identified using identical references, and are not described again.

According to the fourth embodiment, at least one unidirectional diode $D^i$ is arranged in parallel with a switch $K^i$, the or each diode $D^i$ being intrinsic or attached to the switch $K^i$. The control subsystem 14 can then command the switches $K^i$ into the open or closed position.

Figure 8:
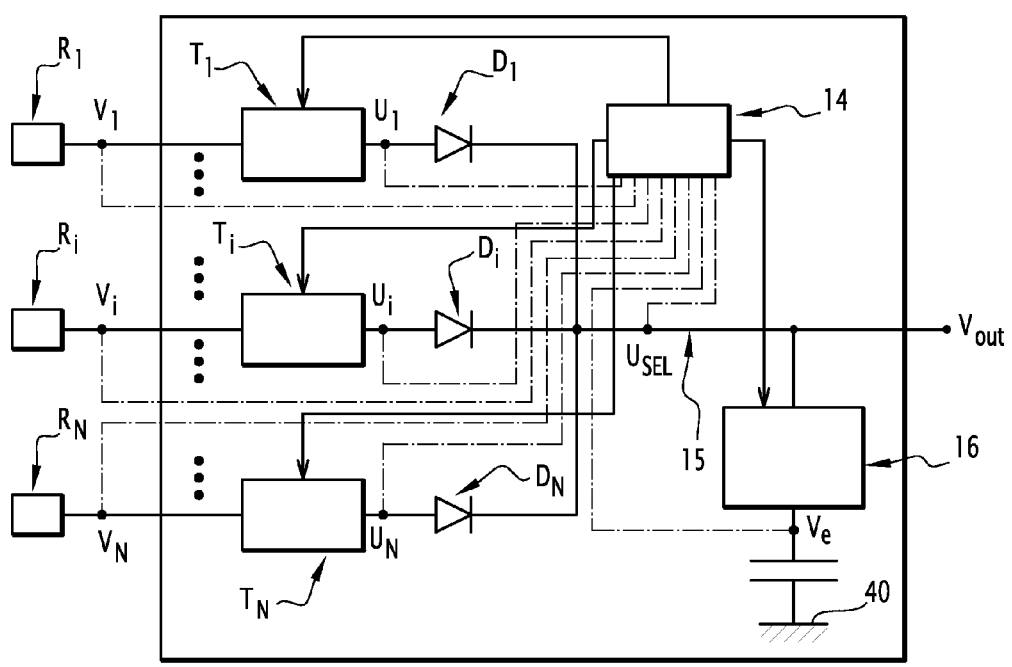
FIG. 8 is a view similar to that of FIG. 1 according to a fifth embodiment of the invention.

FIG. 8 illustrates a fifth embodiment of the power supply system and for which the elements similar to the first embodiment previously described are identified using identical references, and are not described again.

According to the fifth embodiment, all of the controllable members $T^1, \ldots, T^N$ are converters capable of converting the corresponding input voltage $V^1, \ldots, V^N$ into the output voltage $V^{out}$ of the power supply system 10. Associating a power converter with each power supply network $R^1, \ldots, R^N$ in particular makes it possible to limit the energy consumption on the non-selected power supply networks $R^1, \ldots, R^N$.

The shared power supply line 15 forms an output network of the power supply system 10.

The control subsystem 14 can then command the power converters $T^1, \ldots, T^N$ both to select at most one energy source from among the N power supply networks $R^1, \ldots, R^N$ and to regulate the intermediate voltage $U^i$ from the input voltage $V^i$, the output voltage $V^{out}$ then being equal to the intermediate voltage $U^i$.

In this fifth embodiment, the energy converter 16 is dedicated to converting the electrical energy coming from and intended for the energy storage subsystem 18. It is then connected to the output network of the power supply system 10 and is serially mounted with the energy storage subsystem 18 between the shared power supply line 15 and an electrical ground 40.

In an alternative not shown, certain charges require the power supply system 10 to command the switching from the selected network $R^v$ to a redundant network $R^w$, v and w being integers comprised between 1 and N, in the event of outage of the input voltage $V^v$ for a duration longer than a defined delay duration $t^{temp}$. This makes it possible to have a transparency t(i) that is independent of the power delivered by the power supply network $R^v$ and to measure the aging of the storage subsystem 18. In fact, the verification of the condition E=E (w) during a outage of the input voltage $V^v$ for a duration shorter than the delay duration $t_{temp}$ then indicates that the energy storage subsystem 18 have aged.

If the transparency t(v) of the power supply network $R^v$ is greater than the delay duration $t^{temp}$ the switching from the power supply network $R^v$ to another power supply network is allowed for each outage of the input voltage $V^v$ having a duration greater than the transparency t(v). However, in order to avoid the problems that arise during successive power line disturbances and resolved according to the invention by implementing energy levels Ei, this additional switching condition pertaining to the delay duration $t^{temp}$ must account for the cumulative sum of the durations of the power line disturbances having taken place on the power supply network $R^v$, the switching between power supply networks being commanded by the control subsystem 14 in accordance with the first embodiment of the invention.

To that end, the cumulative sum of the durations of the power line disturbances experienced by the delay duration ttemp is stored by a configurable meter such that the stored cumulative sum is reset when the energy level E reaches Emax. In that case, the cumulative sum of all of the power line disturbances experienced by the delay duration ttemp is smaller than the transparency t(v).

One can thus see that the power supply system, in various embodiments, makes it possible to limit the number of switches between the networks. While various embodiments have been described, they are illustrative of the invention and not limiting since the claims define the scope of the invention.

What is claimed is:

1. A power supply system configured to deliver a DC output voltage ($V_{out}$) and of being connected in input to N distinct power supply networks ($R_1, \ldots, R_N$) each delivering an input voltage ($V_1, \ldots, V_N$), N being an integer greater than or equal to 2, the system comprising:
    N controllable energy transfer members ($T^1, \ldots, T^N$), each configured to switch between an open position and a closed position and being connected to a corresponding power supply network ($R^1, \ldots, R^N$);
    a control subsystem for each of the controllable energy transfer members ($T^1, \ldots, T^N$) configured to select one power supply network ($R^1, \ldots, R^N$) from among the N power supply networks ($R^1, \ldots, R^N$) by commanding the controllable energy transfer member ($T^1, \ldots, T^N$) connected to the selected power supply system ($R^1, \ldots, R^N$) into the closed position and commanding the N−1 other controllable power transfer member(s) into the open position ($T^1, \ldots, T^N$), and
    an energy storage subsystem configured to deliver a storage voltage ($V^e$),
    wherein the power supply system further comprises an energy converter (16) connected to the output of the N controllable energy transfer members ($T^1, \ldots, T^N$), the control subsystem being adapted to control the energy converter and the N controllable energy transfer members ($T^1, \ldots, T^N$) to select at most one energy source from among the N power supply networks ($R^1, \ldots, R^N$), as a function of the N input voltages ($V^1, \ldots, V^N$) and the storage voltage ($V_e$).

2. The power supply system according to claim 1, wherein the energy storage subsystem has a maximum storage capacity ($E_{max}$), in that the power supply networks ($R_1, \ldots, R_N$) are ordered by increasing energy levels ($E_1, \ldots, E_N$), each energy level ($E_1, \ldots, E_N$) being predetermined and associated with the corresponding power supply network ($R_1, \ldots, R_N$) and having a positive value below the maximum storage capacity ($E_{max}$), and in that the control subsystem is adapted to select, as a priority, the power supply network ($R_1, \ldots, R_N$) associated with the highest energy level ($E_1, \ldots, E_N$).

3. The power supply system according to claim 2, wherein voltage thresholds ($S_1, \ldots, S_N$) are respectively associated with the power supply networks ($R_1, \ldots, R_N$), the control subsystem configured to controlling the switching from a first power supply network ($R_1, \ldots, R_N$) to a second power supply network ($R_1, \ldots, R_N$) only if the second power supply network ($R_1, \ldots, R_N$) has an input voltage ($V_1, \ldots, V_N$) higher than the corresponding voltage threshold ($S_1, \ldots, S_N$).

4. The power supply system according to claim 2, wherein the difference between two successive energy levels ($E_{u-1}, E_u$) corresponds to the energy supplied by the energy storage subsystem to the energy converter during the outage, for a transparency duration (t(1), \ldots, t(n)) unique to each power supply network ($R_1, \ldots, R_N$), of the input voltage ($V_u$) of the power supply network ($R_u$) with the lowest associated energy level ($E_u$) of the two energy levels ($E_{u-1}$, $E_u$).

5. The power supply system according to claim 4, wherein the control subsystem is adapted to command the switch from a first power supply network ($R_1, \ldots, R_N$), the transparency duration ($t(1), \ldots, t(n)$) of which is longer than a predetermined delay period ($t_{temp}$), to a second power supply network ($R_1, \ldots, R_N$) during a outage of the input voltage ($V_1, \ldots, V_N$) of the first power supply network ($R_1, \ldots, R_N$) for a duration longer than the delay period ($t_{temp}$).

6. The power supply system according to claim 3, wherein the storage voltage ($V_e$) is representative of a quantity of energy (E) of the energy storage subsystem, and in that the control subsystem can command the switch from a first power supply network ($R_1, \ldots, R_N$) to a second power supply network ($R_1, \ldots, R_N$) with a lower associated energy level ($E_1, \ldots, E_N$), during a outage of the input voltage ($V_1, \ldots, V_N$) of the first power supply network ($R_1, \ldots, R_N$), only if the quantity of energy (E) of the energy storage subsystem is lower than the energy level ($E_1, \ldots, E_N$) associated with the first power supply network ($R_1, \ldots, R_N$).

7. The power supply system according to claim 3, wherein the control subsystem is adapted to command the switch from a first power supply network ($R_1, \ldots, R_N$) to a second power supply network ($R_1, \ldots, R_N$) with a higher energy level ($E_1, \ldots, E_N$) only if the amount of energy (E) of the energy storage subsystem (18) is equal to the maximum storage capacity ($E_{max}$).

8. The power supply system according to claim 1, wherein the control subsystem is adapted to command the selection of no energy source by commanding all of the controllable energy transfer members ($T_1, \ldots, T_N$) into the open position.

9. The power supply system according to claim 8, wherein the energy storage subsystem has a maximum storage capacity ($E_{max}$), the control subsystem being operable to inhibit the switch from a first power supply network ($R_1, \ldots, R_N$), toward which switching was commanded from the selection of no energy source, to a second power supply network ($R_1, \ldots, R_N$) as long as the quantity of energy (E) of the energy storage subsystem is not equal to the maximum storage capacity ($E_{max}$).

10. The power supply system according to claim 8, wherein it also comprises a shared power supply line having a selection voltage ($U_{SEL}$), in that the controllable energy transfer members ($T_1, \ldots, T_N$) are connected to the shared power supply line, and in that the control subsystem is configured to command the energy converter and the N controllable energy transfer members ($T_1, \ldots, T_N$) to select at most one energy source from among the N power supply networks ($R_1, \ldots, R_N$), as a function of the N input voltages ($V_1, \ldots, V_N$), of the storage voltage ($V_e$), of intermediate voltages ($U_1, \ldots, U_N$) delivered by the controllable energy transfer members ($T_1, \ldots, T_N$), and of the selection voltage ($U_{SEL}$).

11. The power supply system according to claim 10, wherein the control members are adapted to command the switch to a secured state (FS) of the power supply network in which the controllable energy transfer members ($T_1, \ldots, T_N$) are all commanded into the open position, their command into the closed position being inhibited.

12. The power supply system according to claim 11, wherein the control subsystem is adapted to command the switch from the selection of no energy source to the secured state (FS) if at least one intermediate voltage ($U_1, \ldots, U_N$) is non-zero.

13. The power supply system according to claim 11, wherein the voltage thresholds ($S_1, \ldots, S_N$) are respectively associated with the power supply networks ($R_1, \ldots, R_N$), the switching/selection subsystem being adapted to command the switch of a power supply network ($R_1, \ldots, R_N$) to the secured state (FS) if at least one controllable energy transfer member ($T_1, \ldots, T_N$) other than the controllable power transfer member ($T_1, \ldots, T_N$) associated with the power supply network ($R_1, \ldots, R_N$) has a non-zero intermediate voltage ($U_1, \ldots, U_N$) or if the selection voltage ($U_{SEL}$) is zero whereas the input voltage ($V_1, \ldots, V_N$) of the power supply network ($R_1, \ldots, R_N$) is above the associated voltage threshold ($S_1, \ldots, S_N$).

14. The power supply system according to claim 1, wherein it also comprises a shared power supply line to which the controllable energy transfer members are connected ($T_1, \ldots, T_N$), and in that the power supply system comprises N unidirectional diodes ($D_1, \ldots, D_N$) respectively connected between the output of the given controllable energy transfer member ($T_1, \ldots, T_N$) and the shared power supply line.

15. A power supply system configured to deliver a DC output voltage ($V_{out}$) and of being connected in input to N distinct power supply networks ($R_1, \ldots, R_N$) each delivering an input voltage ($V_1, \ldots, V_N$), N being an integer greater than or equal to 2, the system comprising:
  N controllable energy transfer members ($T^1, \ldots, T^N$), each configured to switch between an open position and a closed position and being connected to a corresponding power supply network ($R^1, \ldots, R^N$);
  control means, for each of the controllable energy transfer members ($T^1, \ldots, T^N$), for selecting one power supply network ($R^1, \ldots, R^N$) from among the N power supply networks ($R^1, \ldots, R^N$) by commanding the controllable energy transfer member ($T^1, \ldots, T^N$) connected to the selected power supply system ($R^1, \ldots, R^N$) into the closed position and commanding the N−1 other controllable power transfer member(s) into the open position ($T^1, \ldots, T^N$), and
  energy storage means for delivering a storage voltage ($V^e$),
  wherein the power supply system further comprises an energy converter (16) connected to the output of the N controllable energy transfer members ($T^1, \ldots, T^N$), the control subsystem being adapted to control the energy converter and the N controllable energy transfer members ($T^1, \ldots, T^N$) to select at most one energy source from among the N power supply networks ($R^1, \ldots, R^N$), as a function of the N input voltages ($V^1, \ldots, V^N$) and the storage voltage ($V_e$).

\* \* \* \* \*